Figure 1:
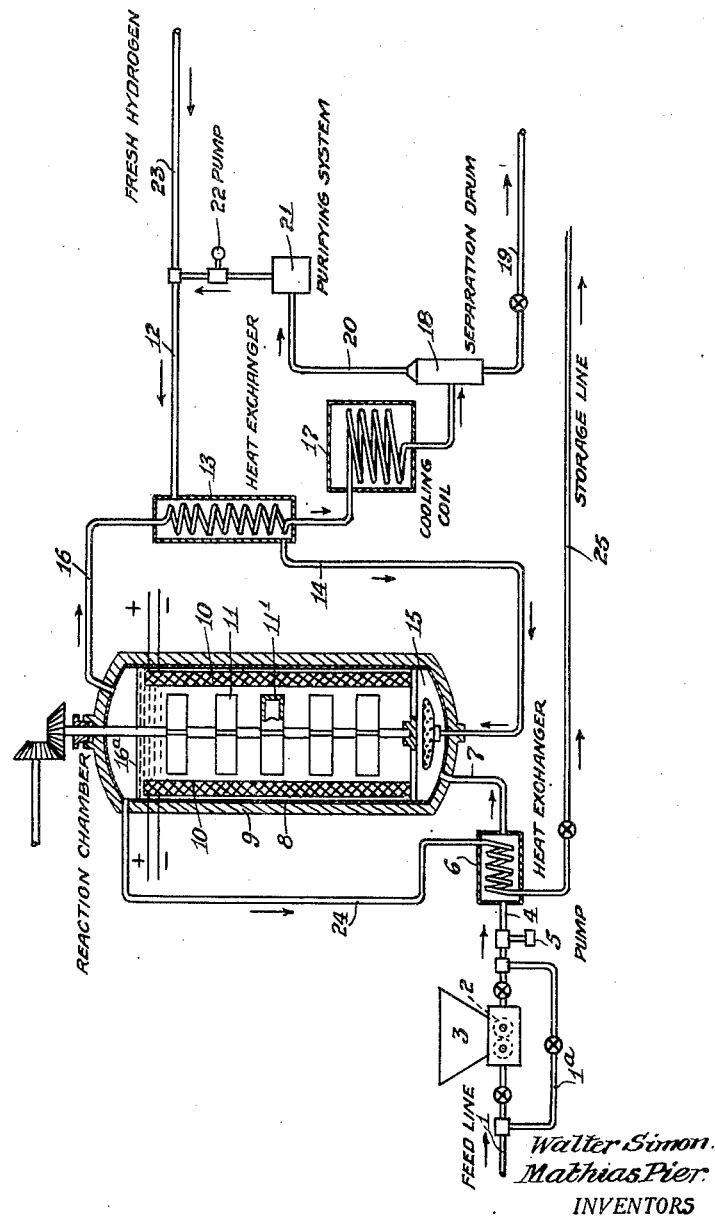

Aug. 15, 1933.    M. PIER ET AL    1,922,499
DESTRUCTIVE HYDROGENATION OF CARBONACEOUS MATERIALS
Filed Sept. 9, 1929    2 Sheets-Sheet 2

*Fig. 2.*

Walter Simon.
Mathias Pier.
INVENTORS

BY Hauff & Warland
ATTORNEYS.

Patented Aug. 15, 1933

1,922,499

UNITED STATES PATENT OFFICE 1,922,499

DESTRUCTIVE HYDROGENATION OF CARBONACEOUS MATERIALS

Mathias Pier, Heidelberg, and Walter Simon, Ludwigshafen - on - the - Rhine, Germany, assignors, by mesne assignments, to Standard I. G. Company, of Linden, N. J., a Corporation of Delaware Application September 9, 1929, Serial No. 391,509, and in Germany September 24, 1928

5 Claims. (Cl. 196—53)

This invention relates to improvements in the manufacture and production of valuable liquid hydrocarbons, which expression also includes hydrocarbon derivatives by destructive hydrogenation of distillable carbonaceous materials.

We have found that the manufacture and production of valuable liquid hydrocarbons and/or hydrocarbon derivatives from distillable carbonaceous materials, such as the various kinds of coal, tars, mineral oils and other bituminous materials, or their distillation or conversion products by destructive hydrogenation at temperatures between 300° and 700° C. and under pressure, preferably under pressures of at least 20 atmospheres, can be carried out in a particularly advantageous manner by employing catalysts, which comprise at least three different constituents, one being an oxide of a metal of group two of the periodic system, and the other two constituents being oxides, hydroxides or sulphides of different metals of the class consisting of cobalt, nickel and metals of the 5th or 6th group of the periodic system. Catalysts of the said kind containing at least two constituents which are different oxides, hydroxides or sulphides of different metals belonging to the sixth group of the periodic system are very advantageous.

In accordance with the present invention, for example, a catalyst which contains two oxides, hydroxides or sulphides of different metals of the class consisting of cobalt or nickel or of metals of the 5th or 6th group of the periodic system and the activity of which is dependent on the nature of the crude materials employed in its manufacture can be considerably improved by the addition of the further constituent hereinbefore specified.

The further constituent may also contribute to the improvement of the catalyst in other respects, for example, it may serve to increase the mechanical stability. The catalysts in accordance with the present invention can be employed for the treatment of initial materials in the liquid state as well as in the vaporous state. As very suitable combinations for catalysts may be mentioned among others, such catalysts prepared from two oxides, hydroxides or sulphides of different metals of the 6th group of the periodic system, and an oxide of a metal of the second group of the periodic system, and, if desired, also further compounds.

Examples of catalysts in accordance with the present invention are those which contain molybdenum trioxide, zinc sulphide and chromic acid in combination with additions of other metal compounds, for example, those of the second group, for instance, magnesium oxide, or those of compounds of the third and fourth groups of the periodic system, for example, kaolin. Catalysts containing in the combination specified at least two oxides, hydroxides or sulphides of different metals from the class consisting of tungsten, molybdenum, uranium, and chromium give good results. Very suitable catalysts are, for example, those prepared from molybdenum trioxide, chromium oxide and zinc oxide or sulphide, with an addition thereto, if desired, of magnesia or kaolin. As typical examples of mixtures for the preparation of such catalysts may be mentioned, a mixture comprising 234 parts of molybdenum trioxide, 81 parts of zinc oxide and 20 parts of chromium oxide or from about 162 to 234 parts of molybdenum trioxide, 40 to 81 parts of zinc oxide, 15 to 30 parts of magnesium oxide and 15 to 20 parts of chromium oxide, or 234 parts of molybdenum trioxide, 81 parts of zinc oxide, 20 parts of chromium oxide and 30 parts of kaolin, or 234 parts of molybdenum trioxide, 97 parts of zinc sulphide, 20 parts of chromium oxide, and 20 parts of kaolin, or 90 parts of molybdenum trioxide, 10 parts of chromium oxide and 20 parts of zinc sulphide, or 144 parts of molybdenum trioxide, 81 parts of zinc oxide, 45 parts of magnesium oxide and 4 parts of chromium oxide, or tungsten trioxide, chromium oxide and magnesium oxide. In the said catalysts at least one or both of the oxides, hydroxides or sulphides of the metals of the 6th group of the periodic system may be substituted by an oxide, hydroxide or sulphide of a metal of the 5th group of the periodic system or of nickel or of cobalt, provided that the said metals or compounds are all different.

Catalysts according to the present invention containing an oxide hydroxide or sulphide of a metal from the 5th group of the periodic system, are for example, a mixture of molybdenum trioxide, zinc oxide and ammonium vanadate or tungstic oxide, zinc oxide and ammonium vanadate or a catalyst prepared from molybdenum trioxide, zinc oxide, chromium oxide and ammonium vanadate. As catalysts according to the present invention may be further mentioned catalysts consisting of molybdenum trioxide, manganous oxide, chromium oxide and zinc sulphide or molybdenum oxide, manganese carbonate, chromium oxide and cobalt sulphide. As an example of a catalyst according to the present invention may be further mentioned a mixture of nickel sulphide, zinc chloride, chromic oxide and Florida earth. It should be understood that the proportions hereinbefore stated are given merely by way of example and are capable of very wide variations and the scope of the invention is not limited to the proportions given.

In the accompanying drawings, apparatus for carrying out the process in accordance with the present invention are illustrated diagrammatically, partly in vertical section. Our invention is not limited to the apparatus illustrated therein, however, but may be varied at will in accordance with the conditions of working.

Referring to the drawings in Fig. 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, above 20–100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and suitable catalytic materials 11' as indicated above are attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulphide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

Referring now to the drawings in Fig. 2 a suitable system is shown for converting solid materials into light liquid oils by two steps. Where possible, the same numeral has been used in Fig. 2 as has already been indicated in Fig. 1. Hydrocarbon oil is withdrawn from any suitable storage, not shown, by a line 1 and may be forced through a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8 shown in Fig. 1 and similar parts are designated by the same numerals. A heavy liquefied material is withdrawn from the base of the oven 8a and may be continuously discharged into the second oven indicated by 8b. This oven is packed with a catalytic material in accordance with the present invention indicated at 11' and with the exception that no stirring mechanism is used it may be constructed similarly to oven 8a.

Hydrogen is forced under high pressure from the line 12, as before, through a heat exchanger 13 and by line 14 and branches 14a and 14b into ovens 8a and 8b respectively. Vaporous products and gas are removed from both ovens by vapor line 16a and 16b respectively which may discharge through a single exchanger 13 to condenser 17. The light oils are separated from the gases in the separator 18 from which the oil is removed by 19 and the gases may be removed, purified and recompressed as indicated in Fig. 1. Heavy oil may be continuously withdrawn from the oven 8b and a part or the whole thereof may be continuously discharged through a line 24a, cooler 26 and conducted by line 25 to any suitable storage. If desired, a part of this oil may be re-circulated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25 so as to prevent accumulation within the system. Fresh hydrocarbon oil may be continuously fed in sufficient quantity to carry in the solid material or if desired, a part of the oil withdrawn from the second oven, either containing ash or from which the ash has been removed by filtration, settling centrifugal means or the like may be recirculated for the purpose of bringing in the fresh solid material.

The following examples will further illustrate the nature of this invention but the invention is not restricted to these examples.

*Example 1*

By treating a topped American crude oil, of which up to 80 per cent boils above 325° centigrade, in the liquid state at 460° centigrade and under a pressure of 200 atmospheres with hydrogen in the presence of a catalyst prepared from molecular proportions of tungstic acid, chromic acid, manganese carbonate and zinc sulphide which is firmly built into the reaction chamber and which is continuously covered with oil, an excellent yield of an oil rich in hydrogen which only contains from 5 to 10 per cent of constituents boiling above 325° centigrade and about from 15 to 20 per cent of benzine boiling up to 180° centigrade is obtained without any formation of coke. In contrast to a catalyst consisting only of tungsten and chromium the catalyst already referred to is characterized not only by a considerably greater efficiency but also by its capacity for retaining its efficiency unimpaired for a long period of time.

*Example 2*

A middle oil obtained by destructive hydrogenation in the liquid phase of low temperature carbonization tar derived from pit coal is passed in the vaporous form together with hydrogen under a pressure of about 200 atmospheres and at a temperature of about 500° centigrade over a catalyst as described in Example 1. The benzine thus obtained is very suitable as an addition to benzine having a tendency to knock when employed in internal combustion engines, the mixture obtained being free from this undesirable property.

What we claim is:

1. A process for the production of valuable liquid hydrocarbons from a distillable carbonaceous material which comprises subjecting said material to destructive hydrogenation with hydrogen under a temperature and pressure suitable for the conversion and in the presence of a catalyst which comprises at least three different constituents, one being selected from the class consisting of the oxides of zinc and magnesium and the sulphide of zinc and the other two being different compounds selected from the class consisting of the oxides and sulphides of nickel and cobalt and the oxides of vanadium and of the metals of the sixth group of the periodic system.

2. A process for the production of valuable liquid hydrocarbons from a distillable carbonaceous material, which comprises subjecting the said material to destructive hydrogenation with hydrogen under a temperature and pressure suitable for the conversion and in the presence of a catalyst which comprises tungstic acid, chromic acid, manganese carbonate and zinc sulphide.

3. A process for the production of valuable liquid hydrocarbons from a crude hydrocarbon oil, which comprises treating said oil in the liquid state at about 460° C. and under a pressure of about 200 atmospheres in the presence of a catalyst comprising tungstic acid, chromic acid, manganese carbonate and zinc sulphide in molecular proportions.

4. A process for the production of valuable liquid hydrocarbons from the distillable carbonaceous material, which comprises subjecting the said material to destructive hydrogenation with hydrogen under a temperature and pressure suitable for the conversion and in the presence of a catalyst which comprises molybdenum oxides, zinc oxide and chromium oxide.

5. A process for the production of valuble liquid hydrocarbons from a distillable carbonaceous material, which comprises subjecting the said material to destructive hydrogenation with hydrogen under a temperature and pressure suitable for the conversion and in the presence of a catalyst which comprises tungstic oxide, zinc oxide and ammonium vanadate.

MATHIAS PIER.
WALTER SIMON.